United States Patent [19]
Goto et al.

[11] Patent Number: 5,429,100
[45] Date of Patent: Jul. 4, 1995

[54] SUPERCHARGED ENGINE

[75] Inventors: Tsuyoshi Goto; Kouichi Hatamura; Masatoshi Shoji, all of Hiroshima, Japan

[73] Assignee: Mazda Motor Corporation, Hiroshima, Japan

[21] Appl. No.: 225,490

[22] Filed: Apr. 8, 1994

Related U.S. Application Data

[63] Continuation of Ser. No. 35,111, Mar. 19, 1993, abandoned.

[30] Foreign Application Priority Data

Mar. 31, 1992 [JP] Japan .................. 4-078059

[51] Int. Cl.⁶ .............................. F02B 29/08
[52] U.S. Cl. .............................. 123/559.1
[58] Field of Search ............ 123/316, 559.1, 564

[56] References Cited

U.S. PATENT DOCUMENTS

| | | | |
|---|---|---|---|
| 4,932,368 | 6/1990 | Abe et al. | 123/559.1 |
| 4,958,606 | 9/1990 | Hitomi et al. | 123/559.1 |
| 5,033,268 | 7/1991 | Hitomi et al. | 123/559.1 |

FOREIGN PATENT DOCUMENTS

| | | |
|---|---|---|
| 0269125 | 6/1988 | European Pat. Off. |
| 63-239312 | 10/1988 | Japan |
| 3-138416 | 6/1991 | Japan |

*Primary Examiner*—Michael Koczo
*Attorney, Agent, or Firm*—Keck, Mahin & Cate

[57] ABSTRACT

The invention provides a supercharged engine including a supercharger and an intercooler disposed downstream of the supercharger. The engine has a geometric compression ratio equal to or higher than 8.5. The supercharger is an internal compression type mechanical supercharger having a pressure ratio higher than 1.8 wherein the pressure ratio is defined as a ratio of a pressure at an inlet opening to a pressure at an exit opening of the supercharger. Intake valve closing timing of the engine supercharger is in the range of 50 to 100 degrees in crank angle as measured from bottom dead center, and an overlapping period during which both intake and exhaust valves open is equal to or below 17 degrees in crank angle wherein the intake valve closing timing is defined as the timing when valve lift is equal to or less than 1 millimeter, and the overlapping period is to be measured on the basis of a valve lift of zero.

7 Claims, 7 Drawing Sheets

SUPERCHARGED ENGINE

This is a continuation of application Ser. No. 08/035,111, filed Mar. 19, 1993, abandoned.

BACKGROUND OF THE INVENTION

This invention relates to a supercharged engine provided with a mechanical type supercharger and an intercooler and having high geometric compression ratio.

RELATED ART STATEMENT

Various types of engines have been known for supercharging inlet-air supplied thereto by way of a supercharger. For instance, Japanese Patent Public Disclosure (Kokai) No. 63-239312 laid open in 1988, discloses an engine provided with a supercharger therein for enhancing fuel consumption as well as output power due to a control for making geometric compression ratio high and delaying closing timing of exhaust valves. This engine keeps a geometric compression ratio over 8.5 and delays intake valve closing timing, defined as the timing when valve lift is 1 millimeter, by more than 50 degrees in crank angle measured from bottom dead center to thereby enhance cyclic efficiency of the engine, suppress knocking and increase exhaust gas temperature. In addition, this Disclosure also discloses a longer overlapping period for obtaining a scavenging effect to enhance anti-knock properties and so on.

Japanese Patent Public Disclosure (Kokai) No. 3-138416 also discloses an engine provided with a supercharger in which a geometric compression ratio is kept over 8.5, and the aforementioned intake valve closing timing is delayed by more than 50 degrees in crank angle measured from bottom dead center.

However, those engines leave problems unsolved in intake valve closing timing, supercharging property of a supercharger, overlapping period during which both intake and exhaust valves open, and so on.

It is beneficial to delay closing timing of exhaust valves for decreasing frequency of knocking to thereby enhance output power at low speed and high load. In addition, a higher geometric compression ratio as well as delayed closing timing of intake valves, leads to an expansion ratio and thus is advantageous for suppressing an increase of exhaust gas temperature to thereby enhance output power at high speed and high load. When the geometric compression ratio is increased, it is desirable to accordingly delay closing timing of intake valves. However, further delaying the closing timing of intake valves makes it necessary to increase supercharging pressure in order to obtain the necessary amount of filling at high load. This brings an enormous increase in supercharging pressure, but it is quite difficult for a turbo charger or Roots-type supercharger to provide high supercharging pressure because of a relative low ratio of pressure at an inlet to pressure at an exit. The ratio is usually below 1.8.

Though higher supercharging pressure enhances a scavenging effect during an overlapping period, during which both and exhaust valves open, a mixture of air and fuel tends to directly flow from intake valves to exhaust valves to thereby cause an increase in emission of hydrocarbons (HC).

SUMMARY OF THE INVENTION

It is therefore an object of the present invention to provide a supercharged engine in which a geometric compression ratio of the engine is made high, a closing timing of intake valves is delayed, and a supercharging property is improved to thereby enhance output power and fuel consumption as well as prevent emission of hydrocarbons from increasing.

For accomplishing the object mentioned above, the invention provides a supercharged engine including a supercharger and an intercooler disposed downstream of the supercharger. A geometric compression ratio of the engine is controlled to be equal to or higher than 8.5. The mechanical type supercharger is an internal compression type mechanical supercharger having a pressure ratio higher than 1.8 wherein the compression ratio is defined as a ratio of a pressure at an inlet opening to a pressure at exit opening of the supercharger. In addition, intake valve closing timing of the engine is in the range of 50 to 100 degrees in crank angle measured from bottom dead center and an overlapping period, during which both intake and exhaust valves open, is equal to or below 17 degrees in crank angle wherein the intake valve closing timing is defined as the timing when valve lift is equal to or less than 1 millimeter and the overlapping period is to be measured on the basis of the valve lift of zero.

In a preferred embodiment, the geometric compression ratio is in the range of 9 to 15.

In another preferred embodiment, an intake valve closing timing Y is determined in relation with an overlapping period X according to the following equation:

$$Y \leq -2.5X - 7.5$$

wherein:

Y represents intake valve closing timing, defined as the timing when valve lift is equal to or less than 1 millimeter, expressed in crank angle measured from bottom dead center; and X represents overlapping period, during which both intake and exhaust valves open, when valve lift is 1 millimeter.

In still another preferred embodiment, opening and closing timings of the intake and exhaust valves are fixed within all driving ranges of the engine.

The opening and closing timings of intake and exhaust valves are defined as aforementioned, since their definition is not standardized. That is, the closing timing of intake valves is defined as the timing when valve lift is 1 millimeter. This is because such a definition is suitable for identifying the period during which air inlet and air exhaust are effectively accomplished, and takes into consideration an amount of inlet-air during an intake stroke and an amount of exhaust gas during an exhaust stroke. In addition, the overlapping period, during which both intake and exhaust valves open, is defined as the timing when valve lift is zero millimeters. This is because even a slight valve lift influences both a scavenging property and direct flow from an intake valve to an exhaust valve during the overlapping period at high level supercharging. It should be noted that the geometric compression ratio is defined as a ratio of a volume of a cylinder when a piston is disposed at bottom dead center to a volume of a cylinder when a piston is disposed at top dead center.

The advantages obtained by the aforementioned supercharged engine will be described hereinbelow.

In the supercharged engine in accordance with the invention, pumping loss is decreased due to the delayed closing timing of the intake valve. Furthermore, an anti-knocking property at low speed and high load is enhanced and exhaust gas temperature at high speed and high load is prevented from increasing because of the higher geometric compression ratio and the much delayed closing timing of intake valve. The engine output power is also enhanced due to the high level supercharging. In addition, emission of hydrocarbons is decreased because of the shorter overlapping period, and the high level supercharging can improve a scavenging property in spite of the shorter overlapping period.

Additionally, even if valve timing is fixed, the shorter overlapping period can prevent exhaust gas at low load from flowing backward.

The above and other objects and advantageous features of the present invention will be made apparent from the following description made with reference to the accompanying drawings.

BRIEF DESCRIPTION OF THE DRAWINGS

FIG. 5 is a graph illustrating the relationship between the closing timing of an intake valve and critical torque and so on.

DESCRIPTION OF THE PREFERRED EMBODIMENTS

A preferred embodiment in accordance with the invention will be explained hereinbelow with reference to drawings.

Figure 1:
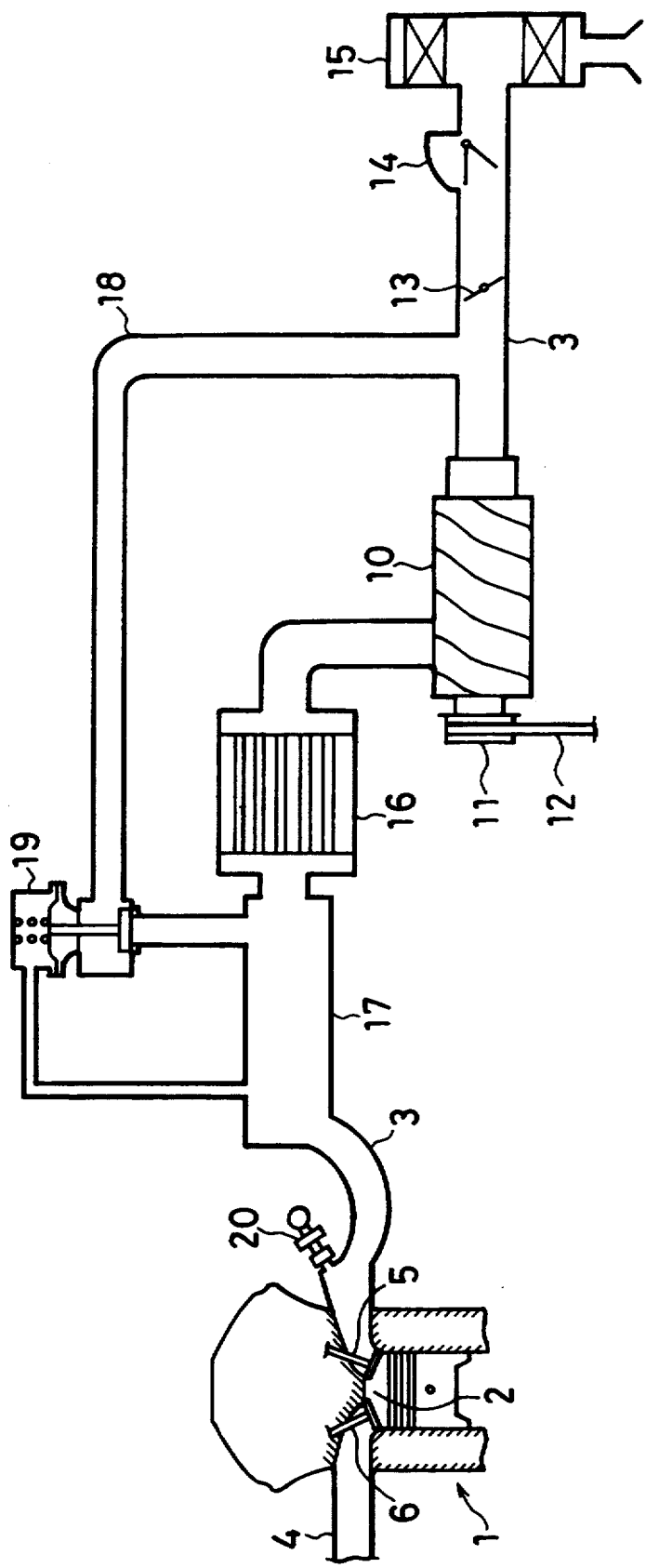
FIG. 1 is a schematic view illustrating the supercharged engine in accordance with the present invention.

FIG. 1 is a schematic view illustrating a supercharged engine in which the invention is embodied. An inlet port disposed downstream of a intake passageway 3 and an exhaust port disposed upstream of an exhaust passageway 4 open to a combustion chamber 2 of an engine 1. An intake valve 5 and an exhaust valve 6 are disposed at these inlet and exhaust ports, respectively. The intake and exhaust valves 5, 6 are controlled to open and close at predetermined timing by means of valve drive mechanism (not shown).

In the intake passageway 3 is disposed a mechanical type supercharger 10. The supercharger 10 is an internal compression type having an absolute pressure ratio of 1.8. This ratio is defined as a ratio of pressure at an inlet to pressure at an exit. In the shown embodiment, the supercharger 10 comprises a screw type of supercharger, which is generally called "a Lysholm-type supercharger". The supercharger 10 is connected to a crank shaft (not shown) through a pulley 11 and a drive belt 12.

A throttle valve 13 is disposed upstream of the supercharger. An air flow meter 14 is disposed upstream of the throttle valve 13 for detecting an amount of inlet-air. An air cleaner 15 is disposed upstream of the intake passageway 3.

Downstream of the supercharger 10 is disposed an intercooler 16, further downstream of which is disposed a surge tank 17. A bypass passageway 18 branches away from the intake passageway 3 to bypass the supercharger 10 and the intercooler 16. On the way of the bypass passageway 18 is disposed a bypass valve 19 which opens or closes according to pressure in the surge tank 17 and is adapted to open at low load. In the vicinity of the inlet port is disposed a fuel injector 20 for injecting fuel into the combustion chamber 2.

Figure 2:
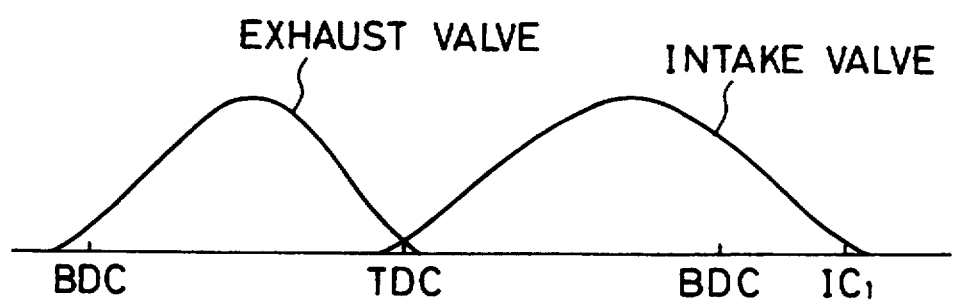
FIG. 2 illustrates valve lift curves.
Figure 3:
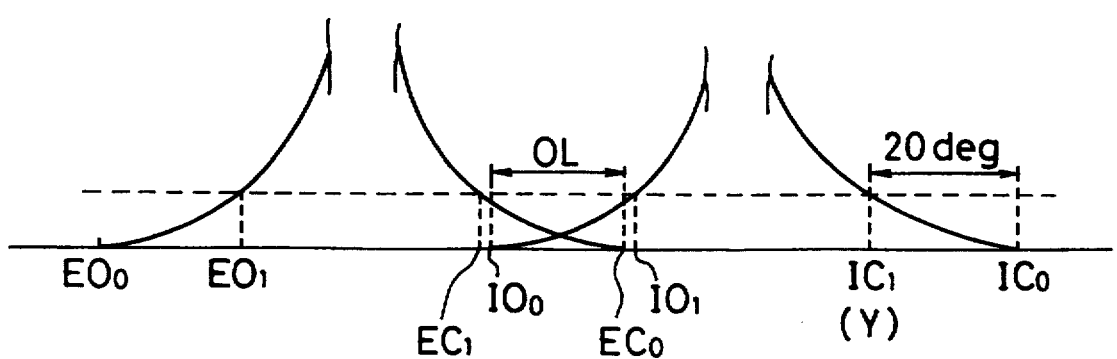
FIG. 3 is an enlarged view of a portion of FIG. 2.

The engine 1 has the geometric compression ratio equal to or higher than 8.5, preferably in the range of 9 to 15. The intake and exhaust valves 5, 6 are driven in accordance with the valve lift curve as illustrated in FIGS. 2 and 3. In particular, closing timing IC1 of the intake valve, which is defined as the timing of the intake valve being closed when the valve lift reaches 1 millimeter, is adapted to be within the range of A-BDC 50 degrees CA to A-BDC 100 degrees CA, and overlapping period OL during which both the intake and exhaust valves open, and which is measured when the valve lift is zero millimeters, is adapted to be equal to or less than 17 degrees CA. As used herein, the term "A-BDC" means "after bottom dead center" and the term "CA" means "crank angle". For instance, "A-BDC 50 degrees CA" means 50 degrees in crank angle measured from bottom dead center. The desirable relationship between the overlapping period and the closing timing of the intake valve is represented by the following equation:

$$Y \leq -2.5X - 7.5 \quad (A)$$

wherein Y represents intake valve closing timing defined as the timing when valve lift is equal to 1 millimeter, and expressed in crank angle measured from bottom dead center, and X represents overlapping period during which both intake and exhaust valves open when valve lift is 1 millimeter. The equation (A) may be transformed into the following equation (B).

$$X \leq -(Y+7.5)/2.5 \quad (B)$$

It should be noted that, as illustrated in FIG. 3, there is a lag of 20 degrees in crank angle in terms of the opening and closing timings of the intake and exhaust valves between a case based on valve lift of 1 millimeter (see IO1, IC1, EO1 and EC1 shown in FIG. 3) and a case based on valve lift of 0 millimeters (see IO0, IC0, EO0 and EC0 shown in FIG. 3). Accordingly, with respect to the overlapping period there is a lag of 40 degrees in crank angle between the aforementioned two cases.

As used hereinbelow, the term "1 mm based overlapping period" refers to an overlapping period during which both intake and exhaust valves open, measured when the valve lift is 1 millimeter, and the term "0 mm based overlapping period" refers to an overlapping period during which both intake and exhaust valves open, measured when the valve lift is 0 millimeters.

Additionally, specific figures on closing timing of the intake valve is meant to be figures defined on the basis of valve lift of 1 millimeter.

Figure 4:
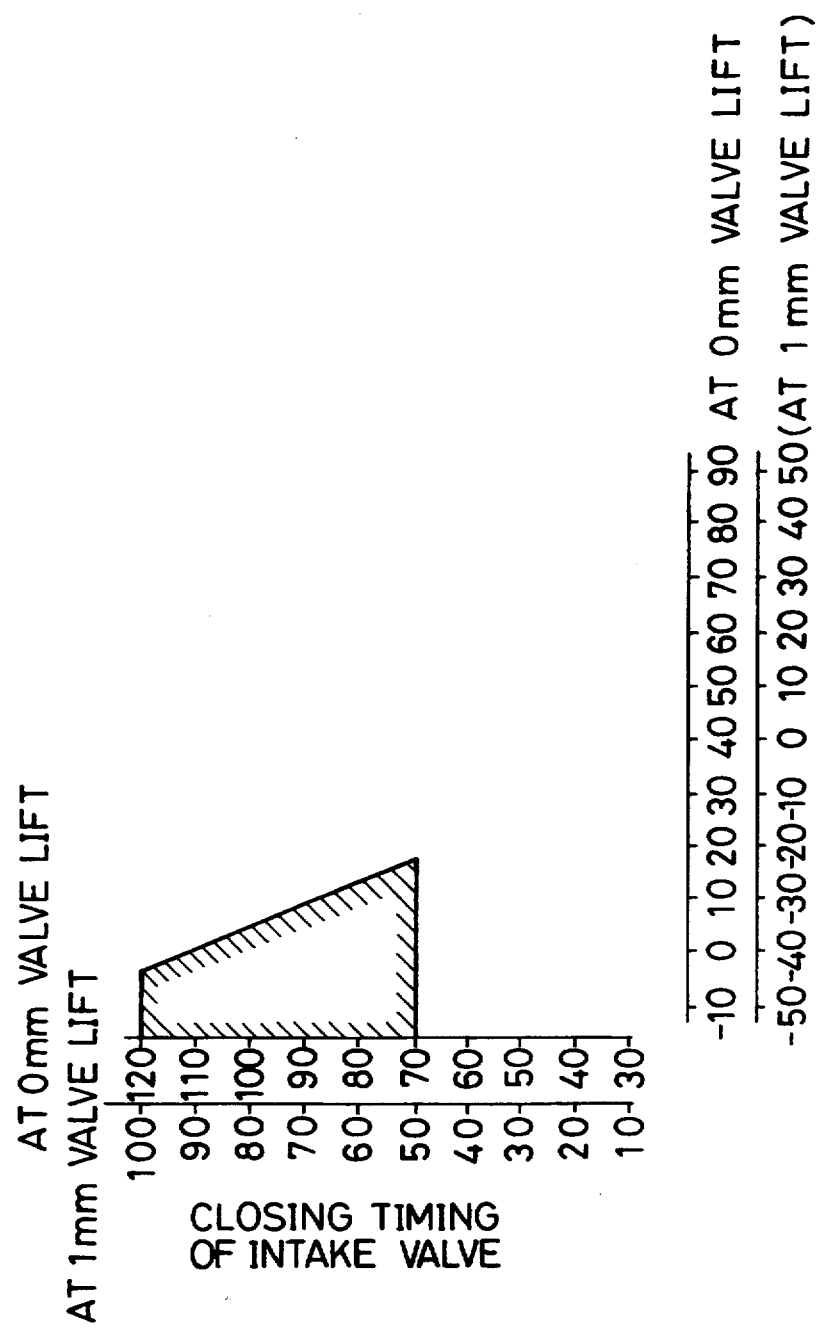
FIG. 4 illustrates the suitable closing timing of an intake valve and overlapping period.

FIG. 4 is a graph having the abscissa representing the overlapping period and the axis of ordinate representing closing timing of the intake valve and illustrates a desirable area for the closing timing and the overlapping period. That is, the hatched area in FIG. 4 represents the area meeting three requirements: (1) the closing timing of the intake valve is within the range of 50 to 100 degrees in crank angle, (2) 0 mm based overlapping period is below 17 degrees in crank angle, and (3) the equation (A) or (B).

Now, with reference to FIGS. 5 to 9, advantages are explained when a pressure ratio of the supercharger 10, compression ratio of the engine 1 and the overlapping period are subject to the aforementioned requirements.

The delayed closing timing of the intake valve together with filling at high load by way of supercharging is advantageous for decreasing frequency of knocking to thereby enhance output power of the engine at low speed and high load which has been deteriorated by knocking. Namely, the delayed closing timing of the intake valve decreases compressed air. Accordingly, however, the delayed closing time is compensated for by compression work done outside the engine by supercharging. In addition, when low temperature and high pressure inlet-air, cooled by an intercooler, is supplied, temperature at top dead center in compression stroke is lowered, thereby suppressing knocking. Accordingly, when supercharging property is enhanced so that engine torque at low speed and high load is to be enhanced to its limit at which knocking is about to occur, the torque at the limit increases as the closing timing of the intake valve delays, as illustrated in lines A1 and A2 in FIG. 5. In addition, the delayed closing timing of the intake valve brings advantages of decreasing pumping loss at low load. As illustrated by lines B1 and B2 in FIG. 5, fuel consumption rate decreases as the closing timing of the intake valve delays. When the closing timing of the intake valve is less than A-BDC 50 degrees CA, the critical torque at which knocking is about to occur decreases and pumping loss increases. Thus, it is advantageous to make the closing timing of the intake valve over A-BDC 50 degrees CA.

Figure 5:
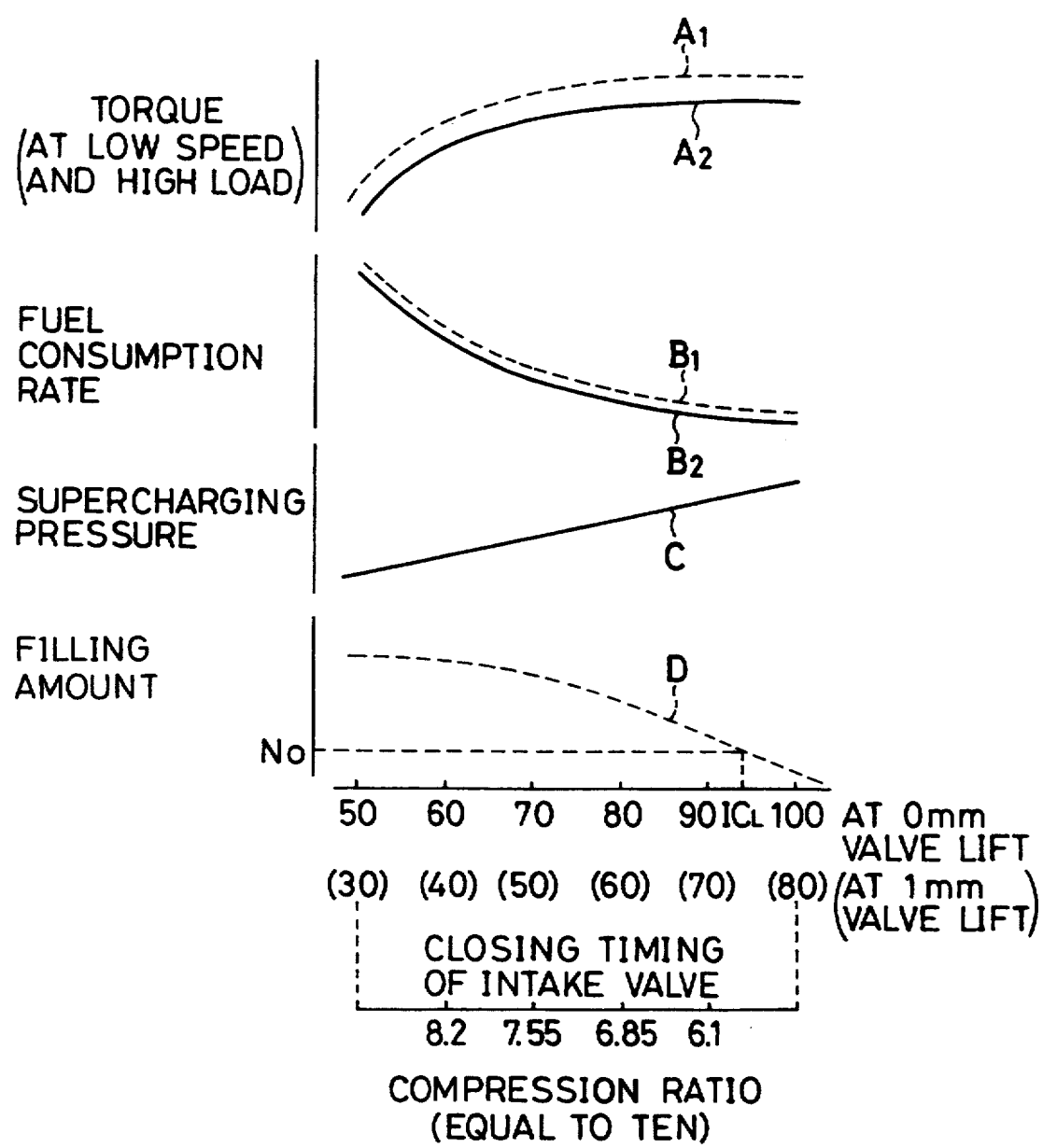

In terms of the critical torque and the pumping loss, FIG. 5 illustrates them in two cases, in one of which the geometric compression ratio of the engine is nine (9), as represented by lines A1 and B1. In the other, the geometric compression ratio is ten (10), as represented by lines A2 and B2. Lower geometric compression ratio decreases the temperature at top dead center in a compression stroke resulting in increasing the critical torque at low speed and high load. However, a lower geometric compression ratio lowers engine cyclic efficiency to cause deterioration of fuel consumption rate, and decreases expansion ratio to prevent output power at high speed and high load from being improved. Therefore, the geometric compression ratio is adapted to be over 8.5, preferably in the range of 9 to 15, in order to improve fuel consumption rate and output power at high speed and high load. Thus, a suitable effective compression ratio can be obtained and the expansion ratio is increased with the closing timing of the intake valve being over A-BDC 50 degrees CA, which means the closing timing of the intake valve is delayed. An upper limit of the compression ratio is determined to be fifteen (15) because a compression ratio larger than fifteen (15) deteriorates engine efficiency due to an increase of friction.

The line C in FIG. 5 represents the relationship between supercharging pressure necessary to obtain constant maximum torque and the closing timing of the intake valve. As shown by the line C, as the closing timing is delayed, the supercharging pressure is increased to compensate for the decrease in the effective compression ratio.

Figure 10:
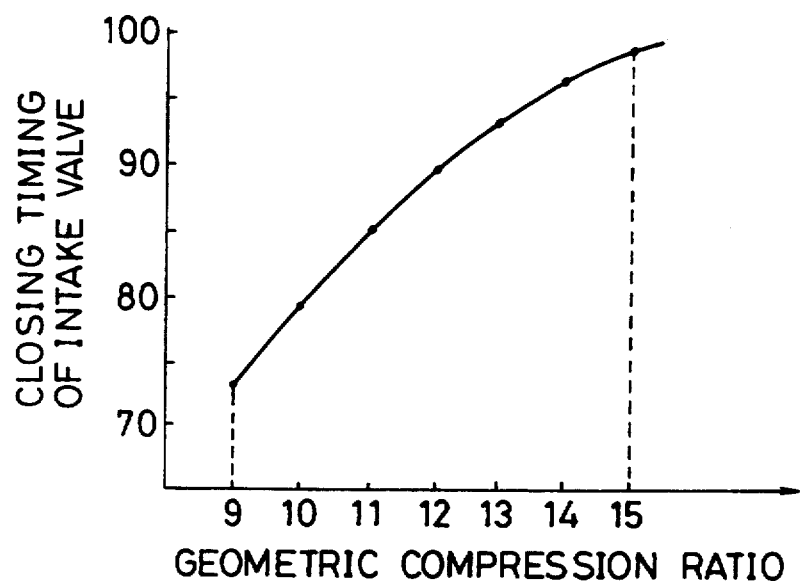
FIG. 10 is a graph illustrating the relationship between the closing timing of an intake valve and the geometric compression ratio.

The line D in FIG. 5 represents the relationship between a filling amount at starting and closing timing of an intake valve. As shown in the line D, the more delayed the closing timing of the intake valve is, the smaller the filling amount gets and the more difficult starting is. It becomes difficult to start when the filling amount is below a predetermined filling amount $N_0$. Accordingly, a critical closing timing $IC_L$ of the intake valve at which starting is impossible is defined as the timing measured when the filling amount is lowered to the predetermined filling amount $N_0$. The line D represents a situation when the geometric compression ratio is nine (9). The aforementioned critical closing timing of the intake valve changes depending on the geometric compression ratio. FIG. 10, having the of ordinate representing closing timing of the intake valve and the axis of abscissa representing geometric compression ratio, illustrates the line on which effective compression ratio is all equal and which corresponds to the critical closing timing of the intake valve. As shown in FIG. 10, when the geometric compression ratio is at its upper limit of about fifteen (15), the critical closing timing of the intake valve is about A-BDC 100 degrees CA, which corresponds to the upper limit of the closing timing of the intake valve.

As the line C represents, the more delayed the closing timing of the intake valve is, the more necessarily supercharging pressure has to be increased, and thus a pressure ratio between pressure at an inlet and pressure at an exit of the supercharger is required to be increased. An internal compression type supercharger meets this requirement. This is explained hereinbelow with reference to FIGS. 6 and 7.

Figure 6:
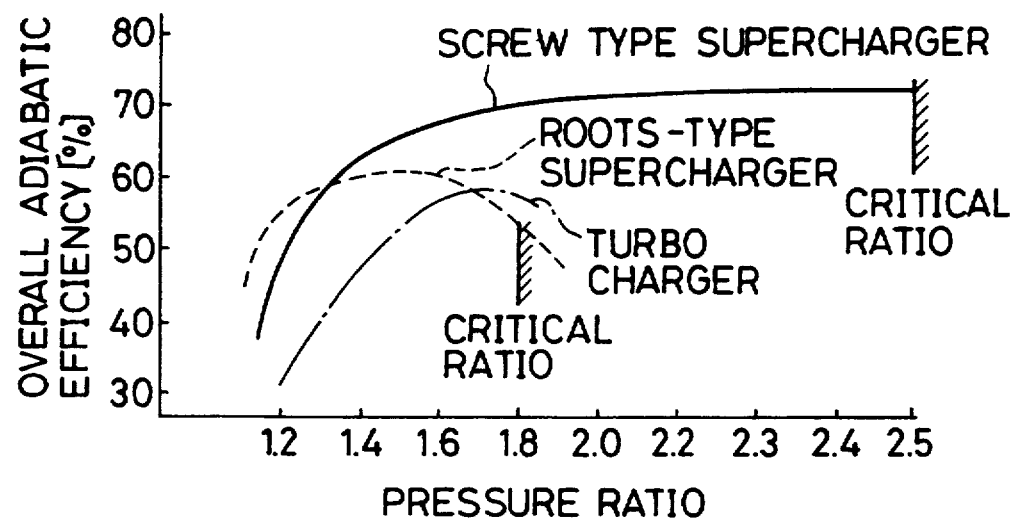
FIG. 6 is a graph illustrating the relationship between the compression ratio and the overall adiabatic efficiency of the supercharger.

FIG. 6 shows the relationship between a pressure ratio between pressure of an inlet and pressure of an exit of a supercharger, and overall adiabatic efficiency in cases of a turbo charger, a Roots-type supercharge, which is a non-internal compression type supercharger and a screw type of supercharger which is an internal compression type supercharger. As shown in FIG. 6, when the pressure ratio comes toward 1.8 in a turbo charger and a Roots-type supercharger, back flow increases with the result that overall adiabatic efficiency is decreased and exit temperature rises. Accordingly, the pressure ratio of 1.8 is a critical ratio for supercharging, and thus it is impossible to raise the supercharging pressure over 1.8. On the other hand, in a screw type of supercharger, overall adiabatic efficiency is not decreased even if the pressure ratio exceeds 1.8, and accordingly the critical pressure ratio in a screw type of supercharger is greater than that of a turbo charger and a Roots-type supercharger.

Figure 7:
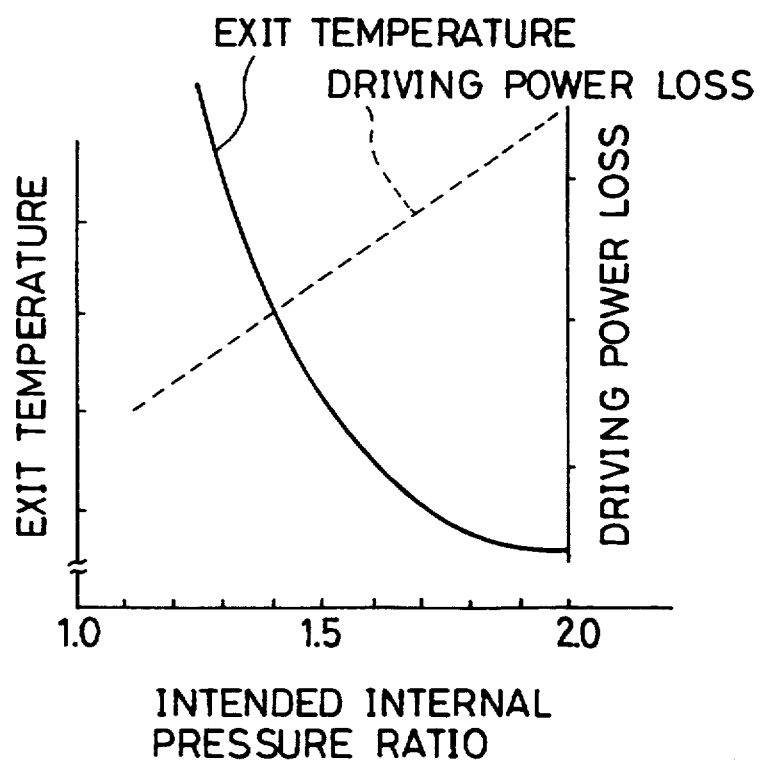
FIG. 7 is a graph illustrating the relationship between the internal compression ratio and the temperature at an exit of the supercharger together with drive loss.

FIG. 7 shows the relationship between intended internal pressure ratio and temperature at an exit and driving power loss when the pressure ratio is designed to be relatively high, for example, about 2.3. As can be seen from FIG. 7, a supercharge,r such as a non-internal compression type which has small intended internal pressure ratio, cannot avoid temperature at an exit from excessively increasing for obtaining high pressure ratio. Accordingly, it is desirable to design the internal pressure ratio to be high in order to avoid the exit temperature from increasing. However, driving power loss is increased due to higher internal pressure ratio when the engine is not supercharged.

The aforementioned properties indicate that the use of an internal compression type supercharger having a pressure ratio higher than 1.8 can effectively increase supercharging pressure. In a preferred embodiment of the invention, the intended internal pressure ratio is about 1.6 and the pressure ratio is about 2.3.

Figure 8:
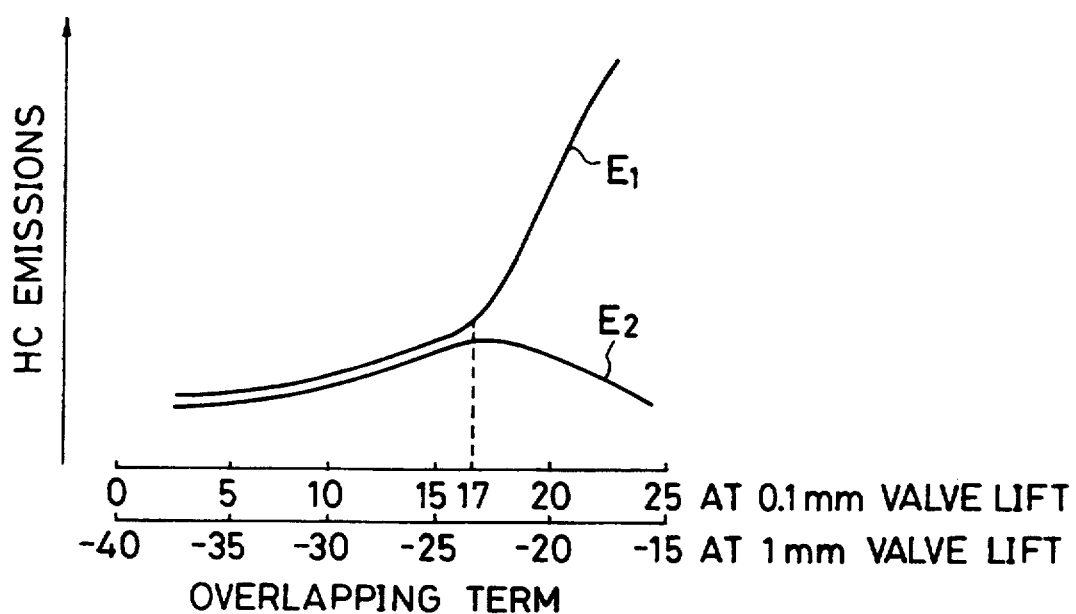
FIG. 8 is a graph illustrating the relationship between the overlapping period and emission of HC.

FIG. 8 shows the relationship between the overlapping period and HC emissions when the closing timing of the intake valve is A-BDC 50 degrees CA. In FIG. 8, the line $E_1$ represents the aforementioned relationship in supercharging area in which inlet-air pressure is higher than supercharging pressure, for instance, in which supercharging pressure is about 600 mmHg, and average effective pressure $P_e$ is nine (9). The line $E_2$ represents the aforementioned relationship in a non-supercharging area in which, for instance, $P_e$ is three (3). As indicated by the line $E_1$, when the overlapping period in supercharging area exceeds 17 degrees in crank angle, HC emissions drastically increase.

Figure 9:
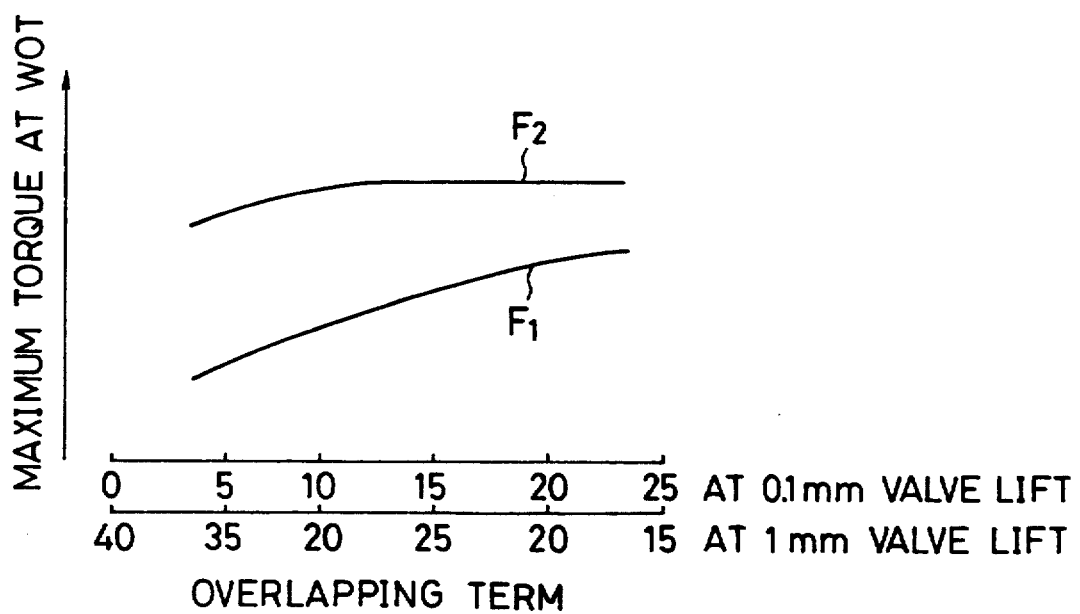
FIG. 9 is a graph illustrating the relationship between the overlapping period and a maximum torque at WOT.

FIG. 9 shows the relationship between the overlapping period and maximum torque at WOT when the closing timing of the intake valve is A-BDC 50 degrees CA. In FIG. 9, the line $F_1$ represents the aforementioned relationship in which supercharging pressure is relatively low when a non-internal compression type supercharger is used, and the line $F_2$ represents the aforementioned relationship in which supercharging pressure is relatively high such as, for example, about 600 mmHg, when internal compression type supercharger having high pressure ratio is used. As indicated by these lines, when supercharging pressure is relatively low, the larger the overlapping period becomes, the higher the output power increases due to the scavenging effect being gradually enhanced even in area wherein the overlapping period is long. On the other hand when the supercharging pressure is sufficiently high, the output power is enhanced by scavenging in the case of a 0 mm based overlapping period occurs initially at a valve much smaller than 17 degrees in crank angle. The output power does not change too much at 17 degrees in crank angle or in the overlapping period higher than 17 degrees in crank angle.

FIGS. 8 and 9 indicate that a 0 mm based overlapping period, equal to or smaller than 17 degrees in crank angle, is effective for decreasing HC emissions and that, in particular, a 0 mm based overlapping period in the range of 4 to 17 degrees in crank angle enhances a scavenging effect as well as decreases HC emissions.

FIGS. 8 and 9 show cases in which the closing timing of the intake valve is A-BDC 50 degrees CA. It should be noted that when the closing timing is delayed much more than the aforementioned cases and the supercharging effect is enhanced accordingly, it is necessary to shorten the overlapping period for decreasing HC emissions.

Table 1 shows the aforementioned relationship. Table 1 shows an increase in HC emissions when supercharging pressure is adjusted at A-BDC 60 degrees CA and A-BDC 70 degrees CA so that an amount of inlet-air is almost equal to that in a control condition, and the overlapping period is equal to that in the control condition, wherein the control condition is a condition in which the closing timing of the intake valve is A-BCD 50 degrees CA and supercharging pressure is, for instance, about 100 mmHg corresponding to average effective pressure $P_e$ being nine (9). The values in table 1 are expressed on the condition that values at the control condition are one (1). Table 1 also shows the overlapping period adjusted so that HC emissions are equal to that at the control condition. Inlet-air ratio in table 1 means a ratio to inlet-air amount when using an ordinary closing timing of the intake valve, not a delayed one.

TABLE 1

| Delayed closing timing | 50 deg. | 60 deg. | 70 deg. |
|---|---|---|---|
| Inlet-air ratio | 0.76 | 0.69 | 0.61 |
| Supercharging pressure (1) | 100 mmHg | 190 mmHg | 300 mmHg |
| HC emissions (2) | 1 | 1.37 | 1.76 |
| overlapping period (3) | 17 deg. | 13 deg. | 9 deg. |

(1) On the condition that inlet-air amount is the same. (2) On the condition that overlapping period is the same. (3) On the condition that HC emissions are the same in amount.

Figure 11:
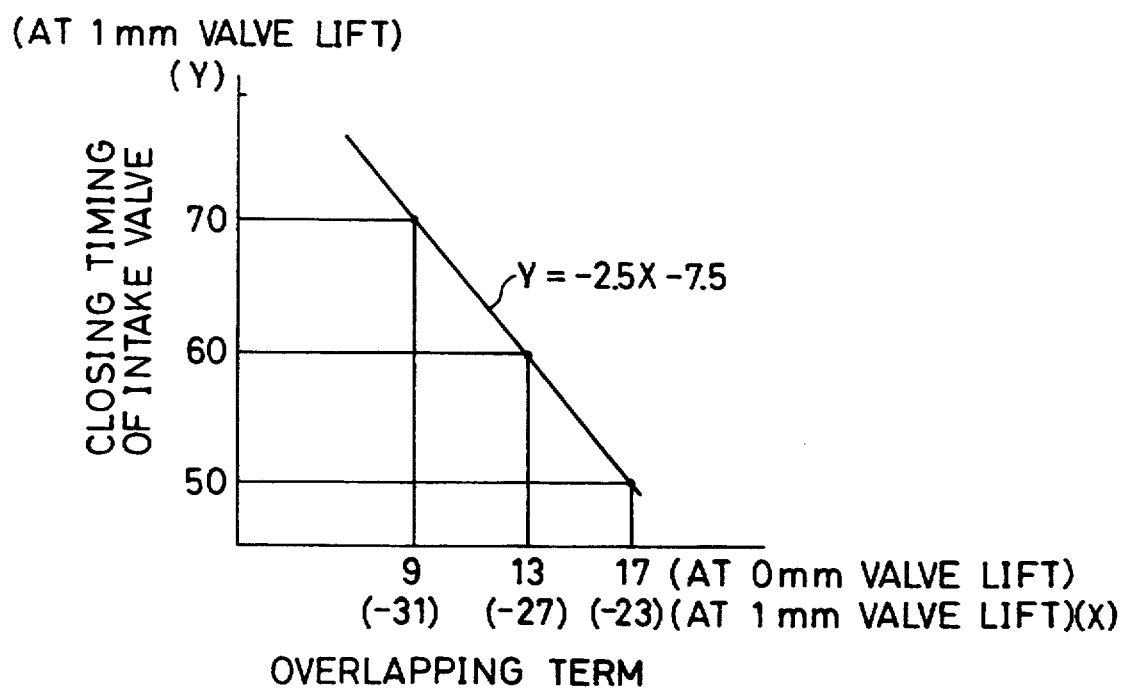
FIG. 11 is a graph illustrating the relationship between the closing timing of an intake valve and the overlapping period.

The line illustrated in FIG. 11 is obtained by plotting the overlapping period listed at the bottom in table 1, and is expressed by the following equation on the basis of valve lift of 1 millimeter.

$$Y = -2.5X - 7.5$$

The aforementioned equation (A) is lead from this equation. The area expressed by the equation (A) effectively decreases HC emissions.

In an engine in which the overlapping period is designed to be longer at high load, there occurs a problem of flowing back of exhaust gas at low load. It is usually required, for solving this problem, to design valve timing so that it is variable and the overlapping period may vary in accordance with loads. On the other hand, the overlapping period is shortened in the invention to thereby obtain combustion stability even if the valve timing is fixed because the flow back of exhaust gas at low load is suppressed.

In a preferred embodiment for accomplishing the aforementioned advantageous effects, the geometric compression ratio of the engine is ten (10), the pressure ratio is about 2.3 using a Lysholm-type supercharger, the closing timing of the intake valve is A-BDC 60 degrees CA and the 0 mm based overlapping period is about 7 degrees in crank angle.

As described above with reference to the preferred embodiments, the present invention has many advantages as follows.

In the invention, a higher geometric compression ratio and a much delayed closing timing of the intake valve are helpful for avoiding knocking and increasing exhaust gas temperature. In addition, high supercharging can increase output power of the engine, and the aforementioned shortened overlapping period decreases HC emissions. Even if the overlapping period is shortened, higher supercharging pressure meets with a sufficient scavenging effect. Thus, HC emissions are decreased while the output power both, at low speed and high load, and high speed and high load is maintained so as not to deteriorate.

In particular, the geometric compression ratio within the range of 9 to 15 brings advantages of avoiding exhaust gas temperature from increasing.

Furthermore, the aforementioned relationship expressed by the equation (A) brings advantages of decreasing HC emissions.

In one embodiment of the invention, the opening and closing timings of the intake and exhaust valves are fixed within all driving ranges of the engine. This structure does not need a valve timing varying a mechanism for varying overlapping period to thereby make the engine simple. In addition, a shortened overlapping period suppresses HC emissions at high supercharging area and also prevents flow back of exhaust gas at low load from increasing. Therefore, even if valve timing is fixed, output power at high load is enhanced and combustion at low load is kept stable.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A supercharged engine comprising:
   an intake valve;
   an exhaust valve;
   a supercharger; and
   an intercooler disposed downstream of said supercharger,
   a geometric compression ratio of the engine being controlled to be at least equal to 8.5,
   said supercharger comprising an internal compression type mechanical supercharger having a supercharging pressure ratio higher than 1.8 wherein said supercharging pressure ratio is defined as a ratio of a pressure at an inlet opening to a pressure at an exit opening of the supercharger,
   an intake valve closing timing Y of said engine being in the range of 50 to 100 degrees in crank angle, measured from bottom dead center, and an overlapping period X, during which both of the intake and exhaust valves open, being no greater than 17 degrees in crank angle, wherein said intake valve closing timing is defined as a timing when valve lift is no greater than 1 millimeter and the intake valve closing timing Y is determined in relation with the overlapping period X according to the following equation:

$$Y \leq -2.5X - 7.5$$

wherein:
   Y is defined as the timing when valve lift is at least equal to 1 millimeter and is expressed in crank angle measured from bottom dead center; and
   X is a period during which both of the intake and exhaust valves open when valve lift is 1 millimeter.

2. The supercharged engine in accordance with claim 1, wherein said geometric compression ratio is in the range of 9 to 15.

3. The supercharged engine in accordance with claim 1, wherein opening and closing timings of the intake and exhaust valves are fixed within all driving ranges of said engine.

4. A supercharged engine comprising:
   an intake valve;
   an exhaust valve;
   a supercharger; and
   an intercooler disposed downstream of said supercharger,
   a geometric compression ratio of the engine being controlled to be in the range of 9 to 15,
   said supercharger comprising an internal compression type mechanical supercharger having a supercharging pressure ratio higher than 1.8 wherein said supercharging pressure ratio is defined as a ratio of a pressure at an inlet opening to a pressure at an exit opening of the supercharger,
   an intake valve closing timing Y of said engine being in the range of 50 to 100 degrees in crank angle measured from bottom dead center, and an overlapping period X, during which both of the intake and exhaust valves open, being no greater than 17 degrees in crank angle, wherein said intake valve closing timing is defined as a timing when valve lift is no greater than 1 millimeter and the intake valve closing timing Y is determined in relation with the overlapping period X according to the following equation:

$$Y \leq -2.5X - 7.5$$

wherein:
   Y is defined as the timing when valve lift is no greater than 1 millimeter and is expressed in crank angle measured from bottom dead center; and
   X is a period during which both of the intake and exhaust valves open when valve lift is 1 millimeter.

5. The supercharged engine in accordance with claim 4, wherein opening and closing timings of the intake and exhaust valves are fixed within all driving ranges of said engine.

6. A supercharged engine comprising:
   an intake valve,
   an exhaust valve,
   a supercharger having a supercharging pressure ratio greater than 1.8 wherein said supercharging pressure ratio is defined as a ratio of a pressure at an inlet opening to a pressure at an exit opening of the supercharger, and
   an intercooler disposed downstream of said supercharger, said intake valve having an intake valve closing timing Y which is determined in relation with an overlapping period X according to the following equation:

$$Y \leq -2.5X - 7.5$$

wherein:
   Y is a timing when valve lift is at least equal to 1 millimeter and expressed in terms of a crank angle measured from bottom dead center; and
   X is a period during which both said intake valve and said exhaust valve open when valve lift is 1 millimeter.

7. A supercharged engine as defined by claim 6, wherein a geometric compression ratio of the engine is greater than 8.5.

* * * * *